United States Patent [19]
Souillard

[11] 3,800,215
[45] Mar. 26, 1974

[54] METHOD AND APPARATUS FOR LOCALIZING PHASE-TO-PHASE AND PHASE-TO-GROUND FAULTS IN POWER LINES

[75] Inventor: Michel Souillard, Pontenay-aux-Roses, France

[73] Assignee: Compteurs Schlumberger, Montrouge, France

[22] Filed: Nov. 17, 1972

[21] Appl. No.: 307,340

[30] Foreign Application Priority Data
Nov. 19, 1971 France .................... 71.41458

[52] U.S. Cl. .................... 324/52, 317/36 D
[51] Int. Cl. .................... G01r 31/08
[58] Field of Search ............ 324/51, 52; 317/36 D

[56] References Cited
UNITED STATES PATENTS
3,192,442 6/1965 Warrington et al. ........... 317/36 D
3,593,124 7/1971 Cahen et al. ................. 324/52
3,612,989 10/1971 Souillard et al. .............. 324/52

Primary Examiner—Gerard R. Strecker
Attorney, Agent, or Firm—William R. Sherman; Roylance, Abrams, Berdo & Kaul

[57] ABSTRACT

Disclosed is a method for localizing phase-to-phase and phase-to-ground faults such as short circuits in a polyphase power line. The method includes the steps of deriving three voltages $u$, $v$ and $w$, $u$ being proportional to the voltage of the faulty line loop, $v$ being a reference voltage across a resistor fed by a current proportional to the faulty current, and $w$ being a reference voltage proportional to a voltage drop in a reference length of the faulty line loop measured across a reference impedance network fed by line currents. The voltages $u$, $y$ and $w$ are integrated for a time interval chosen such that the time integral of the voltages $v$ is null at the end of said time interval. The integrated values of the voltages $u$ and $w$ obtained at the end of the time interval are stored and arithmetic operations are performed on the stored values to provide information as to the location of fault. An apparatus for implementing this method is also disclosed.

12 Claims, 5 Drawing Figures

METHOD AND APPARATUS FOR LOCALIZING PHASE-TO-PHASE AND PHASE-TO-GROUND FAULTS IN POWER LINES

BACKGROUND OF THE INVENTION

This invention relates to a method of and an apparatus for localizing faults such as short-circuits in electrical power lines.

In fault location methods of the prior art, voltages and currents appearing at the input terminal of the line during the fault are sampled and the samples thereof are stored. An analysis is performed on the stored samples to obtain a measure of the distance to and hence the location of the fault point. In cases where the measurement method involves sampling, the peak-value of signal amplitudes, the distance measurement is often distorted by aperiodic components in the faulty current as well as by any fault resistance. In cases where the method involves sampling the instantaneous signal values at particular instances of time, such as the zero crossing point of the faulty current, the distance measurement can be independent of the aperiodic component in the faulty current and, in some cases, also independent of the fault resistance. However, the latter method often introduces measurement errors of a random nature attributable to transient oscillations in the line and to other disturbances which appear at the time of measurement.

The object of the present invention is a method of and an apparatus for localizing faults in power lines which overcome the aforesaid drawbacks of prior techniques.

SUMMARY OF THE INVENTION

Disclosed is a method for localizing phase-to-phase and phase-to-ground faults in a polyphase power line by measuring the magnitudes of currents and voltages at a measuring point. A first step of the method comprises deriving three voltages, $u$, $v$ and $w$ wherein in the voltage $u$ is the voltage of the faulty line loop at the measuring point; the voltage $v$ is a reference voltage across a resistor fed by a current proportional to the faulty current and the voltage $w$ is a reference voltage proportional to a voltage drop in a reference length of the faulty line loop measured across a reference impedance network fed by the line currents. In a second step, the voltages $u$, $v$ and $w$ are integrated for a time interval chosen such that the time integral of the voltage $v$ is brought to a predetermined value, typically zero, at the end of the time interval. In a third step, the integrated values of the voltages $u$ and $w$ at the end of the time interval are stored so as to be available during a sufficient time to carry out arithmetic operations of a fourth step. The signal obtained at the end of the fourth step is representative of the location of the fault with respect to the measuring point.

An apparatus for implementing the method of the present invention comprises a detection device for measuring the current and the voltage of each phase conductor and for determining thereof the line loop which is faulty. The detection device controls an impedance network which generates the above-defined voltages $u$, $v$ and $w$ which are each applied to an integrator. The integrators include first means controlled by a peak detection circuit fed by the voltage $v$ so as to start the integration at a maximum of the voltage $v$. The integrators also include second means controlled by a voltage comparator for stopping the integration when the time integral of the voltage $v$ returns to zero as well as for holding the output voltages of the integrators integrating the voltages $u$ and $w$. The integrated values of the voltages $u$ and $w$ are applied to a computing device which delivers a signal representative of the location of the fault with respect to the measuring point.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of this specification, and wherein.

DESCRIPTION OF AN ILLUSTRATIVE EMBODIMENT

Figure 1:
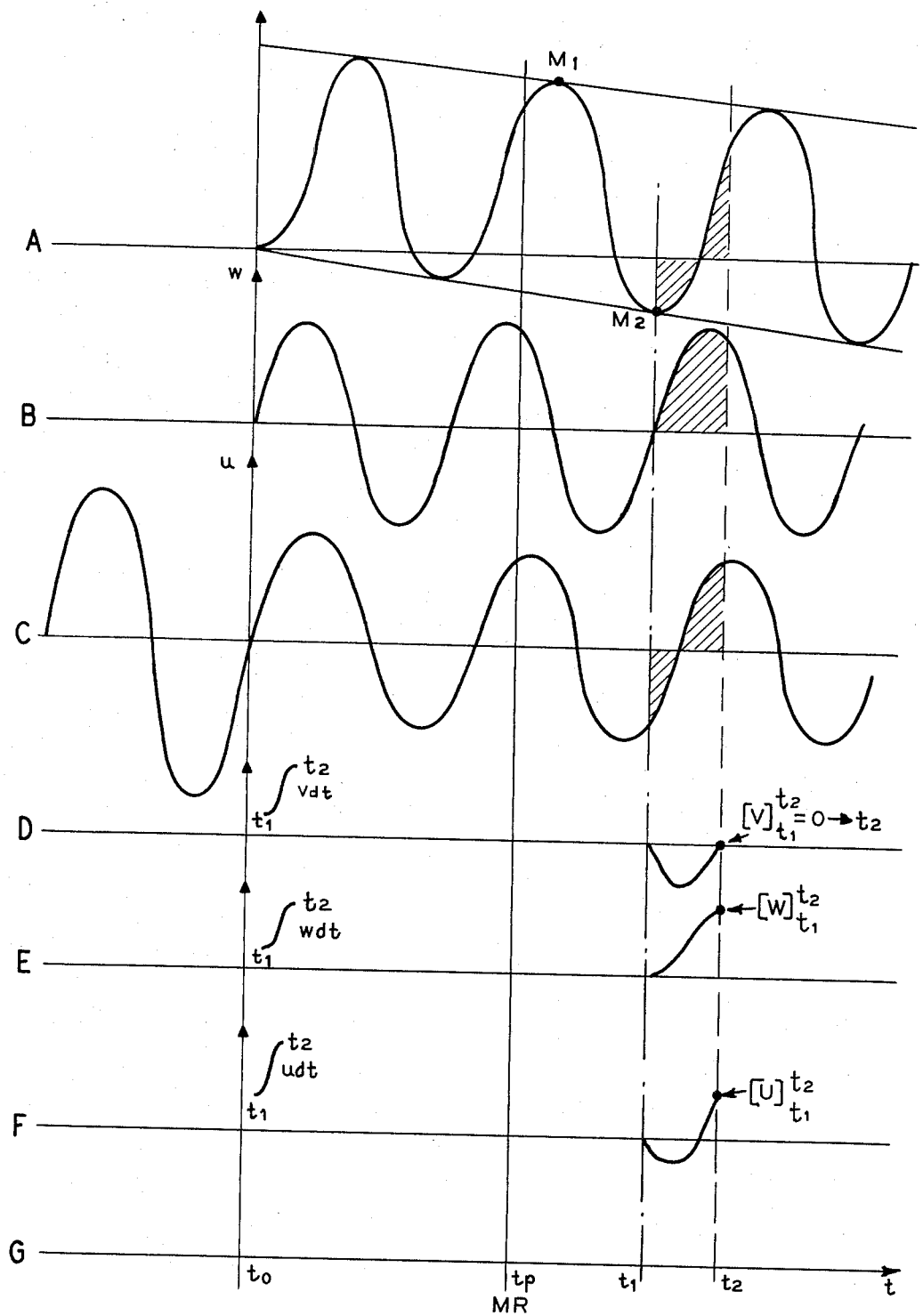
FIG. 1 is a diagram showing as a function of time the voltage waveforms illustrating the method of the present invention.

To understand the principles underlying the method of the present invention, the equation defining the instantaneous value of the voltage $u$ at a measuring point of a line loop having a resistance defect such as a short circuit, can be expressed as:

$$u = xv + yw, \quad (1)$$

wherein $v$ and $w$ are reference voltages generated locally at the measuring point such as the input terminal of the power line by using reference impedances fed by line current; $x$ is a coefficient of proportionality between the local voltage and the voltage drop in the fault resistor; $y$ is a coefficient or portionality between the local line image voltage and the actual voltage drop across the line between the measuring point and the fault point. In other words, $y$ represents the distance of the fault point with respect to the measuring point.

a. As the reference voltage $v$ is proportional to the voltage drop across the fault resistor, this voltage is measured across a resistor R supplied with a current proportional to the actual current at the fault point.

In the case of a phase-to-ground fault in a line with a double supply, the homopolar currents at the ends of the line are proportional to the actual current $i_D$ at the fault point, then the voltage $v$ can be expressed as:

$$v = R \cdot i_o = \alpha \cdot R_D \cdot i_D,$$

wherein $i_o$ designates the hompolar current, $R_D$ the resistance at the fault point and $\alpha$ a proportionality coefficient.

In the case of a phase-to-phase fault, for example, between phases $a$ and $b$, the reference voltage $v$ can be expressed as:

$$v_{ab} = R\,(i_a - i_b),$$

wherein $i_a$ and $i_b$ being the currents in the $a$ and $b$ phase conductors.

b. As the reference voltage $w$ is proportional to the voltage drop across a reference length of the defective line loop, this voltage is measured across a reference impedance fed by the line current.

In the case of a phase-to-ground fault, for example, on the phase $a$ of a three-phase line, the voltage $w$ can be expressed as:

$$w_a = r\,(i_a - i_o) + l\,d\,(i_a - i_o)/dt + r_o\,i_o + l_o\,di_o/dt\,,$$

in which $r, l$ and $r_o, l_o$ designate the heteropolar and homopolar resistances and inductances of a unit length of the line, respectively.

In the case of a fault between two phases, the phases $a$ and $b$, for example, the voltage $w$ can be expressed as:

$$w_{ab} = r\,(i_a - i_b) + l\,d\,(i_a - i_b)/dt.$$

The method according to the present invention is based upon the fact that the equation (1) is also applicable when $u$, $v$ and $w$ are the values obtained by integrating the voltages $u$, $v$ and $w$ during a same time interval.

The integrated value of the voltage $u$ between the instants $t_1$ and $t_2$ can be expressed as:

$$\int_{t_1}^{t_2} u\,dt = x\int_{t_1}^{t_2} v\,dt + y\int_{t_1}^{t_2} w\,dt, \qquad (2)$$

which becomes:

$$[U]_{t_1}^{t_2} = x[V]_{t_1}^{t_2} + y[W]_{t_1}^{t_2}.$$

In accordance with the present invention, the integration instants $t_1$ and $t_2$ are chosen so that:

$$\int_{t_1}^{t_2} v\,dt = [V]_{t_1}^{t_2} = 0,$$

and the equation (2) becomes:

$$\int_{t_1}^{t_2} u\,dt = y\int_{t_1}^{t_2} w\,dt,$$

hence $\quad [U]_{t_1}^{t_2} = y[W]_{t_1}^{t_2}$

In order to know the distance of the fault point with respect to the measuring point the two integrated voltages:

$$\int_{t_1}^{t_2} u\,dt \text{ and } \int_{t_1}^{t_2} w\,dt$$

are stored and their ratio is calculated by an analog or digital method so as to determine $y$ which is proportional to the distance to the fault point $$y = \frac{\int_{t_1}^{t_2} u\,dt}{\int_{t_1}^{t_2} w\,dt} = \frac{[U]_{t_1}^{t_2}}{[W]_{t_1}^{t_2}}. \qquad (3)$$

When it is desired that the apparatus implementing the method operates as a distance relay so as to provide an "on-off" information according to the position of the fault point with respect to a point located at a preset distance $y_1$ from the measuring point, the difference $$D = \int_{t_1}^{t_2} u\,dt - y_1\int_{t_1}^{t_2} w\,dt = (y - y_1)\int_{t_1}^{t_2} w\,dt, \qquad (4)$$

i.e.

$$D = [U]_{t_1}^{t_2} - y_1[W]_{t_1}^{t_2} = (y - y_1)[W]_{t_1}^{t_2}$$

is calculated. A comparison of the sign of the voltage $D$ and that of the voltage $$\int_{t_1}^{t_2} w\,dt$$

permits one to determine the sign of $(y - y_1)$, and hence the position of the fault with respect to a point located at the preset distance $y_1$ from the measuring point.

The starting time $t_1$ of the three integrations is defined by a threshold type measurement circuit, such as a voltage comparator, capable of detecting either a maximum of $v$ or an instant between the maximum and a consecutive zero voltage crossing. The end $t_2$ of the integration will thus necessarily be defined by the instant at which the integral $\int v\,dt$ will return to zero.

As mentioned hereinabove, FIG. 1 illustrates the voltage waveforms obtained for a maximum value of the aperiodic component of a fault current flowing through a conductor as a junction of time.

FIG. 1–A illustrates the waveform of the voltage $v$ proportional to the faulty current;

FIG. 1–B illustrates the waveform of the voltage $w$ measured across the image impedance of a reference length of line;

FIG. 1–C illustrates the waveform of the voltage $u$ at the input of the faulty line loop;

FIG. 1–D illustrates the waveform of the integrated value $[V]_{t_1}^{t_2}$ of the voltage $v$ between the instants $t_1$ and $t_2$;

FIG. 1–E illustrates the waveform of the integrated value $[W]_{t_1}^{t_2}$ of the voltage $w$ between the instants $t_1$ and $t_2$;

FIG. 1–F illustrates the waveform of the integrated value $[U]_{t_1}^{t_2}$ of the voltage $u$ between the instants $t_1$ and $t_2$; and FIG. 1–G illustrates the time references $t_o$, $t_p$, $t_1$, $t_2$ defined as follows:

$t_o$ is the instant of the fault occurrence;
$t_p$ is the starting time of the circuit implementing the method of the present invention;
$t_1$ is the beginning of the integration time; and
$t_2$ is the end of the integration time.

The final amplitudes $[V]_{t_1}^{t_2}$, $[W]_{t_1}^{t_2}$ and $[U]_{t_1}^{t_2}$ illustrated in FIGS. 1–D to 1–F, respectively, correspond to the algebraic sum of the hatched areas on the waveforms illustrated in FIGS. 1–A to 1–C, respectively.

A choice of the instant $t_1$ may be made as follows. If the faulty current and, consequently, the voltage $v$ contains an aperiodic component, the instant $t_1$ must correspond to the half-wave of current of polarity opposite that of the aperiodic component. That is, $t_1$ is defined on the basis of the smallest maximum amplitude of $v$ in absolute value. Otherwise, the time integral $\int v\, dt$ would never return to zero and the instant $t_2$ could never be defined. The choice of the starting time $t_1$ of the integration can be set and hence defined by a voltage comparator of conventional type which compares the amplitudes of the successive maximums of opposite polarity so as to detect the maximum having the smallest amplitude.

The choice of the integration time interval can also be obtained by means of an integrator performing the time integration function $\int v\, dt$. In fact, if the starting time of the integration coincides with time of a first maximum $M_1$, it is sufficient to check that the return to zero of the integrator performing the time integration function $\int v\, dt$ occurs before the following maximum $M_2$. Alternatively, the integrators may be reset, then reactivated at the time of the following $M_2$; the return to zero of the integrator providing the time integral $\int v\, dt$ should then take place prior to the next succeeding maximum.

In the above-described method, the starting instant $t_1$ can be chosen in the vicinity of the smallest current (or voltage) maximum in absolute value, that is to say, in the half-wave of signal of polarity opposite that of the aperiodic component and for a time interval during which the current (or voltage) transformer is not saturated. Hence, there is no error attributable to saturation at this precise moment, and during the rest of the cycle this factor has no influence on the precision of the measurements.

Figure 2:
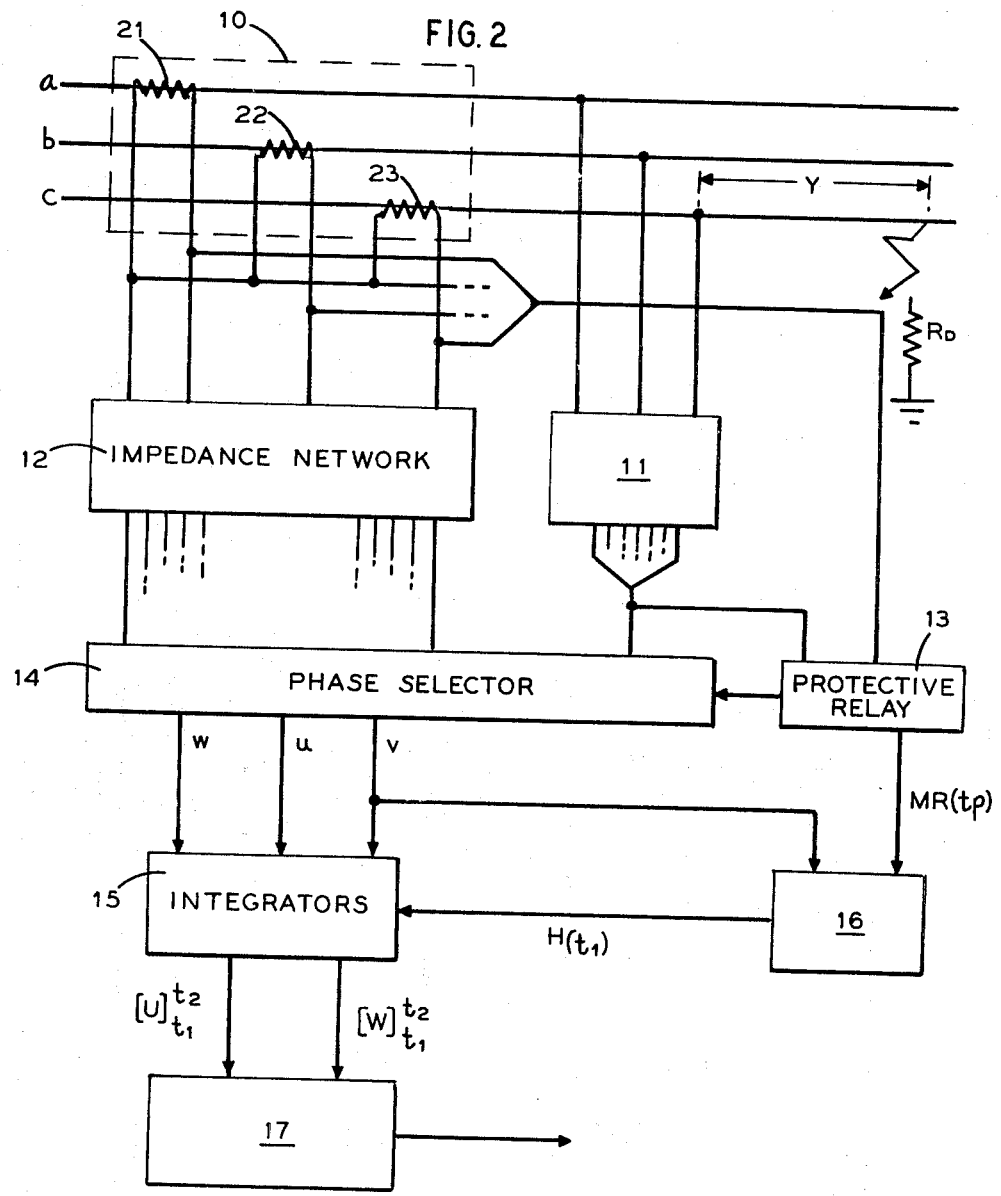
FIG. 2 is a schematic diagram, in block form, of a circuit for implementing the method according to the present invention.

Turning now to FIG. 2, the three conductors $a$, $b$ and $c$ of a three-phase power line to be supervised are connected to a first measurement device 10 measuring the phase currents $l_a$, $l_b$ and $l_c$ and to a second measurement circuit 11 measuring the voltage $u$ for each of the six measurement loops between phases and phase-to-ground. The measurement device 10 includes a star three-phased transformer whose only secondary windings 21, 22 and 23 are shown on FIG. 2. The four output terminals of the current measuring device 10 are connected to an impedance network 12 which generates the voltages $v$ and $w$ for each of the six measurement loops. The impedance network 12 as well as the measurement device 11 are well known in the art and, for example, may be of the type described in U.S. Pat. No. 3,612,989 with reference to FIG. 3.

The output terminals of the device 10 are also connected to a protective device 13 to which are applied the output voltages $u$ of the device 11. This protective device 13 is well known to those working in the art of protective relays and is described, for example, in A. R. Van C. Warrington – Protective Relays – Vol. 1 – Chapter 6 – Second Ed. (1962) – Chapman and Hall. The device 13 detects the line loop which is faulty and generates signals to control the switching device 14 to which are applied the voltages $u$, $v$ and $w$ provided by the circuits 11 and 12 so as to deliver the three voltages $u$, $v$ and $w$ corresponding to the faulty line loop.

Device 15, connected to the outputs of the device 14, comprises three integrators, one for each of the signals $u$, $v$ and $w$. The starting instant $t_1$ of the three integrators is defined by a signal H generated by a maximum or peak detection circuit 16 which determines the instant $t_1$ by detecting the first maximum value $M_1$ of voltage $v$ (FIG. 1–A). The detection circuit 16 will be hereinafter described in detail with reference to FIG. 3.

The device 15 provides at its output terminals the signals $[U]_{t_1}^{t_2}$ and $[W]_{t_1}^{t_2}$ which are applied to an operational circuit 17 including either a divider of the analog or digital type, or a subtractor and a polarity comparator, depending on whether the device is used as a fault locator in accordance with equation (3), above, or as an "on-off" distance relay in accordance with equation (4), above.

Figure 3:
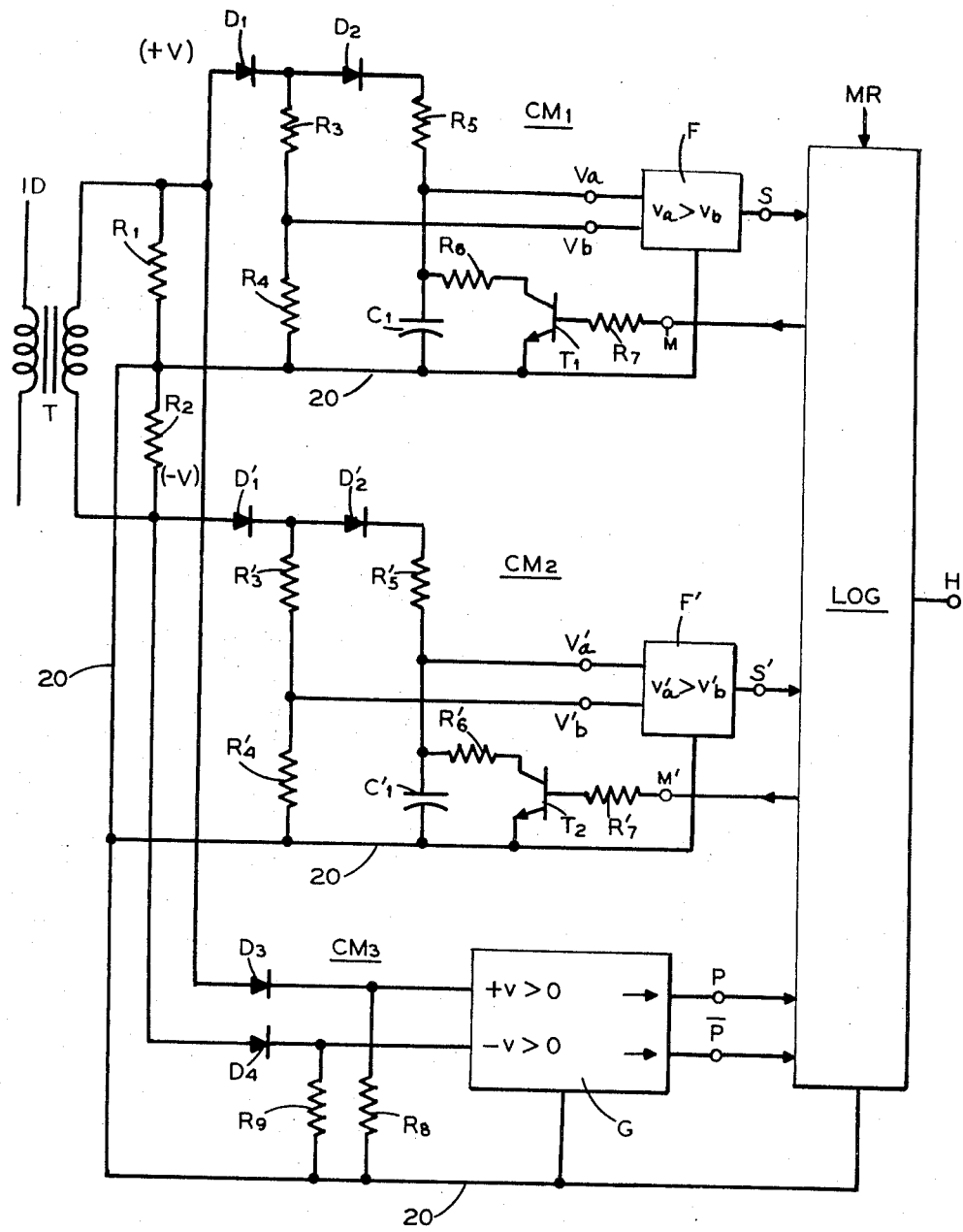
FIG. 3 is a detailed schematic diagram of a peak detection circuit utilized in accordance with the present invention.

Referring now to FIG. 3, a peak detection circuit 16 designed to deliver the signal H which actuates the integrators of the device 15 comprises two similar measurement circuits CM1 and CM2 supplied with the voltages $+v$ and $-v$, respectively, taken at the terminals (resistors $R_1$ and $R_2$) of the secondary winding of a voltage transformer T. A voltage $v$ corresponding to the faulty loop is applied to the primary winding of that transformer. Diodes at the input of each measurement circuit provide the supply voltages for the measurement circuits CM1 and CM2.

As the measurement circuit CM2 is similar to the measurement circuit CM1, the same letter references are given to the like components and are distinguished by a prime. The measurement circuit CM1 includes a voltage comparator F having a first input terminal to which is applied a voltage $v_a$ obtained at the common point of a capacitor $C_1$ connected to the secondary winding of the transformer T via diodes $D_1$ and $D_2$. The comparator F has a second input terminal to which is applied a voltage $V_b$ provided by a voltage divider including resistors $R_3$ and $R_4$. The resistor $R_4$ is connected to the common line 20 and the resistor $R_3$ is connected to the common junction of diodes $D_1$ and $D_2$. The comparator F provides a logic signal S, with S = 1 for $v_a > v_b$, to a logic circuit, designated LOG, which will be described hereinafter. The capacitor $C_1$ is discharged by means of an NPN transistor $T_1$ controlled by a logic signal M = 1 delivered by the logic circuit LOG. The emitter of the transistor $T_1$ is directly connected to the common line 20 while its collector is connected to the capacitor C by way of a resistor $R_6$. The signal M is applied to the base of the transistor by way of a resistor $R_7$.

The maximum or peak voltage detection circuit of FIG. 3 also comprises a third measurement circuit CM3 including a polarity comparator G supplied with the voltages $+v$ and $-v$ through diodes $D_3$ and $D_4$, respectively, the cathode of each diode being connected to the common line 20 through a resistor $R_8$ for diode $D_3$ and through a resistor $R_9$ for diode $D_4$. The comparator G provides complementary logic signals P and $\bar{P}$, with P = 1 when $v > 0$, and these signals are applied to the logic circuit LOG. This comparator G performs the two logic functions $M = S' \cdot \bar{P}$ and $M' = S \cdot P$, so that the discharge of the capacitors $C_1$ and $C'_1$, by the signals M and M', respectively, is obtained between a maximum and the following zero of the voltage $v$.

The operation of the detection circuit will now be explained with reference to the waveform diagrams of FIG. 4. At the time $t_p$, the protective device P previously triggered at time $t_o$ when the fault occurs, delivers a starting signal MR which actuates the logic circuit LOG. The measurement circuit CM1 is supplied with the voltage $+v$ during the first half-wave and capacitor $C_1$ is charged so that $v_b$ follows the value of $v$ while $v_a$ keeps the maximum positive value of $v$. The result is that after the maximum, $|v_a| > |v_b|$ the comparator F delivers a signal S = 1, FIG. 4–D.

Figure 4:
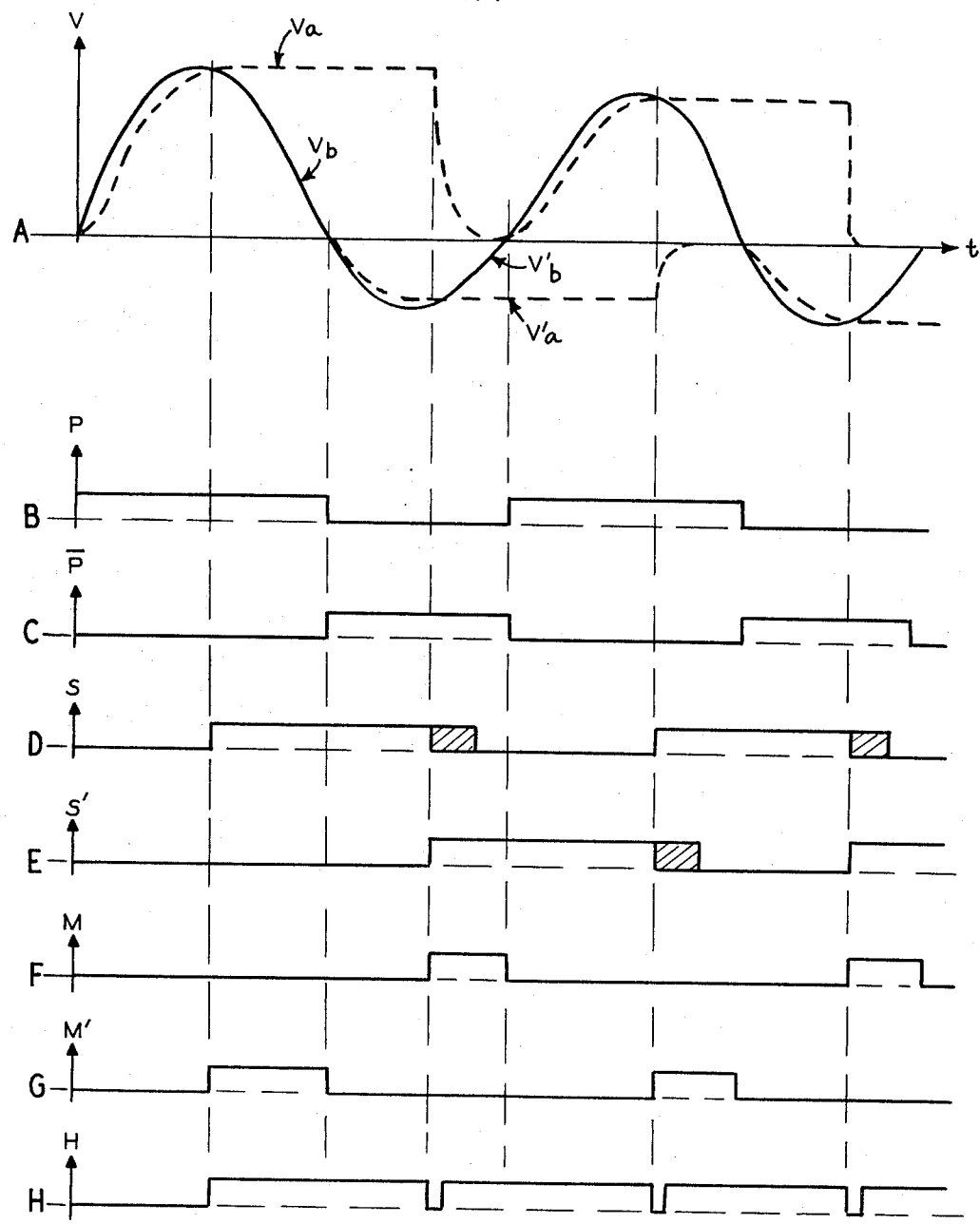
FIG. 4 is a timing diagram showing signals illustrating the mode of operation of the apparatus for implementing the method according to the present invention.

The same applies to the negative polarity in the circuit CM2 which delivers a signal S' = 1 when $|v'_a| > |v'_b|$, i.e., the maximum negative value of $v$, FIG. 4–E.

The waveforms of FIGS. 4–B and 4–C illustrate the signals P and P̄ provided by the comparator G when the voltage $v$ is positive and negative, respectively. The signals P and P̄, FIGS. 4–B and 4–C, as well as the signals S and S' are applied to the logic circuit LOG which generates the signals M and M', FIGS. 4–F and 4–G, controlling the discharge, whose duration is shown by the hatched areas of FIGS. 4–D and 4–E, of the capacitors $C_1$ and $C_2$, respectively, between a maximum and the following zero.

The logic signal H determining the starting instant $t_1$ of the integration interval is obtained by performing the logic function H = (S + S') · ($\overline{ST + S' \cdot T'}$), FIG. 4–H, in which the logic signals T and T' are obtained by monostable circuits triggered by the leading edges of the signals S and S', respectively. This signal H starts a short time, for example $l$ ms, after each positive or negative maximum and lasts until the following maximum of opposite polarity.

As previously described, if the integrator providing the time integral $$\int_{t_2}^{t_2} v\,dt$$

returns to zero at a time $t_2$ before the following maximum of the voltage $v$, the measurement is valid. Conversely, at the following maximum, the integrators must be reset by a signal H = O of short duration so as to start a new integration cycle. This is achieved by means of two delay elements or monostable circuits triggered by the leading edges of the signals S and S', respectively, and providing logic signals T and T' having a "O" logic value at the end of the delay time. Typically, this delay is on the order of $l$ ms. The signal H = (S + S') · ($\overline{ST + S' \cdot T'}$) is thus zero as long as T or T' is a logical 1, and is used to reset the integrators.

Figure 5:
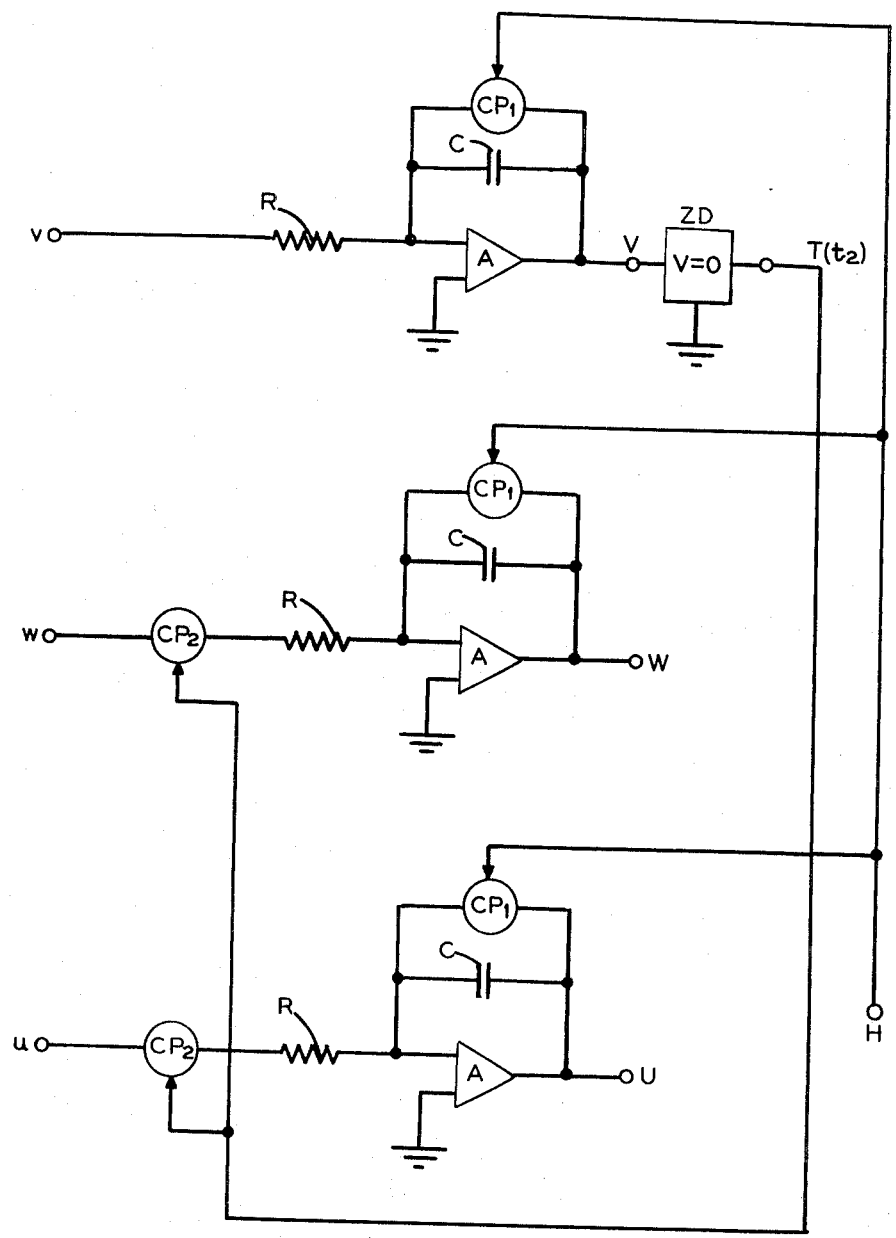
FIG. 5 is a detailed schematic diagram of an integrating circuit arrangement utilized in accordance with the present invention.

FIG. 5 illustrates an embodiment of the circuit I which carries out the integration of the voltages $u$, $v$ and $w$. Each integrator includes an operational amplifier A comprising an input resistor R and a negative feedback capacitor C. The values of the resistor R and of the capacitor C are the same for the three integrators when the apparatus of the present invention is utilized as a fault locator. However, it will be noted that the time constant of the integrator performing the integrating function $\int v\,dt$ can be any value whereas the time constants of the integrators performing the integration functions $\int u\,dt$ and $\int w\,dt$ must be in a known ratio, usually one. A switch $CP_1$, connected in parallel to each capacitor $C_1$ is controlled by the signal H so as to discharge the capacitor C when H = O. The output of the integrator performing the integration functions $\int v\,dt$ is connected to the input of a zero detector ZD delivering, at the instant $t_2$, an inhibiting signal to the gate circuits $CP_2$ connected at the input terminal of the other two integrators in order to store the integrated values of $u$ and $w$. These integrated values are applied to the operational circuit 17 of FIG. 2. The connection between the integrators and the operational circuit 17 can be continuous, but the value of the result displayed in the operational circuit 17 will be significant only at the instant $t_2$ defined by the detector ZD. After being reset by the signal H = O, the integrators are again actuated for a new cycle by the signal H = 1 which opens the switches CP1.

When the apparatus of the present invention is utilized as a distance relay, the term $y_1$ appearing in equation (4) hereinabove can be introduced by suitably adjusting the resistance value of the resistor R of the integrator integrating the voltage $w$. This adjustment is made such that the ratio between the RC time constants of the integrators performing the integration functions $\int u\,dt$ and $\int w\,dt$ is proportional to $y_1$.

By using an associated device for detecting the aperiodic saturation of the current transformers, for example of the type described in U.S. Pat. No. 3,678,377, it is possible to control the operation of the integrators so that the integration takes place within that part of the waveform of the secondary voltage during which the current transformer is not saturated. To achieve this, the starting time $t_1$ must coincide with the smallest maximum of current in absolute value, i.e. with the maximum which has a polarity opposite that of the aperiodic component, for example M2, FIG. 1–A. Under these conditions, the final instant $t_2$ will always occur prior to the saturation of the transformer.

The invention has been described in detail with reference to preferred embodiments thereof, but it will be understood that variations and modifications can be effected within the spirit and scope of the invention as described hereinabove and as defined in the appended claims.

What is claimed is:

1. A method for localizing faults in a faulty polyphase power line by measuring the magnitudes of currents and voltages at a measuring point which comprises the steps of:

producing three voltages, a first voltage $u$ being the voltage of the faulty line at the measuring point, a second voltage $v$ being a reference voltage across a resistor fed by a current proportional to the faulty current, and a third voltage $w$ being a reference voltage proportional to a voltage drop in a reference length of the faulty line measured across a reference impedance network fed by the line currents;

integrating the voltages $u$, $v$ and $w$ for a time interval chosen so that the time integral of the second voltage $v$ is null at the end of said time interval;

storing the integrated values of the first voltage $u$ and third voltage $w$; and performing arithmetic operations on the stored values so as to provide a signal representative of the location of the fault.

2. A method according to claim 1 wherein the arithmetic operation is the ratio between the integrated values of the first voltage $u$ and the second voltage $w$, whereby the distance from the measuring point at which the fault has occurred will be proportional to said ratio.

3. A method according to claim 1 wherein the arithmetic operations include a subtraction between the integrated values of the first voltage $v$ and of the third voltage $w$, and a polarity comparison between the voltage resulting from the subtraction and the integrated value of the third voltage $w$ so as to determine the position of the fault point with respect to a preset distance.

4. A method according to claim 1 wherein the beginning of the time interval of integration is chosen in the half-wave of the second voltage $v$, during which the absolute value of the maximum is smaller than that of the maximum of the preceding half-wave.

5. A method according to claim 4 wherein the beginning of the time interval of integration coincides with a maximum of the second voltage $v$.

6. A method according to claim 1 wherein the beginning of the time interval of integration coincides with the maximum which has a polarity opposite that of the aperiodic component of the current in the faulty line.

7. Apparatus for localizing faults in a polyphase power line comprising:
  means for detecting the line loop which is faulty;
  means for measuring the current and the voltage of the faulty line loop;
  means for generating a first reference voltage proportional to the faulty current in the faulty line loop as well as a second reference voltage proportional to the voltage drop in a reference length of the faulty line loop;
  first means for integrating the first reference voltage corresponding to the faulty line loop for a time interval smaller than a half-cycle, said time interval being chosen such that the time integral is null at the end thereof;
  second means for integrating the voltage of the faulty line loop and of the corresponding second reference voltage for said time interval; and
  means for performing arithmetic operations on the output signals provided by said second means at the end of said time interval so as to obtain a signal representative of the location of the fault.

8. Apparatus according to claim 7 further comprising:
  means for actuating the first and second means for integrating at a maximum of the first reference voltage;
  a zero detector circuit for detecting when the output signal of the first means for integrating returns to zero;
  means responsive to the zero detector circuit for holding the output signals provided by the second means for integrating at the level reached when the output signal of the first means for integrating returns to zero; and
  means for resetting the first and second means for integrating if the output of the first integrating means does not return to zero before the following maximum of the first reference voltage.

9. Apparatus according to claim 7 further comprising:
  a peak detection circuit for detecting the successive maximums of the first reference voltage;
  first switching means responsive to the output signal of the peak detection circuit for resetting the first and second means for integrating during a short time interval at each maximum of the first reference voltage, said first switching means being normally in a position for which the first and second means for integrating are operative;
  a zero detector circuit for providing an output signal when the output signal of the first means for integrating returns to zero; and
  second switching means associated with the second means for integrating and responsive to the output signal of the zero detector circuit for holding the output signal of the second means for integrating at the level reached when the output signal of the first means for integrating returns to zero.

10. Apparatus according to claim 9 wherein the peak detection circuit comprises:
  a first and a second voltage comparators comparing for each polarity a voltage proportional to the first reference voltage and a voltage proportional to the peak value of the first reference voltage taken at the terminals of a capacitor, said first and second voltage comparators providing signals S and S', respectively, when the reference voltage is smaller than its peak value;
  first and second monostable circuits triggered by the leading edges of signals S and S', respectively, for providing output signals T and T' of very short duration, respectively;
  a third voltage comparator providing signals P and P when the first reference voltage is of one polarity or of the opposite, respectively;
  a logic circuit carrying out the logic functions
  $M = S' \cdot P$
  $M' = S \cdot P$.
  $H = (S + S') \cdot (\overline{S \cdot T} + \overline{S' \cdot T'})$ said first switching means being responsive to the logic signal H for resetting the first and second means for integrating;
  means responsive to the signals M and M' for discharging the capacitors associated with the first and second voltage comparators, respectively.

11. Apparatus for measuring the distance of a fault with respect to a measuring point in a polyphase power line comprising;
  means for measuring voltages of each of the phase-to-phase and phase-to-ground line loops;
  means for measuring currents flowing in each of the phase conductors of the polyphase power line;
  means for deriving from said currents and for each of the phase-to-phase and phase-to-ground line loops a first reference voltage proportional to the current flowing in a line loop as well as a second reference voltage proportional to a voltage drop in a reference length of a line loop;
  means for detecting the line loop which is faulty;
  switching means controlled by the detecting means for selecting the voltage of the faulty line loop as well as the first and second reference voltages corresponding to the faulty line loop;
  means for simultaneously integrating the voltage of the faulty line loop and the first and second reference voltages corresponding to the faulty line loop for a time interval which is chosen so that the time integral of the first reference voltage is null at the end thereof;
  means for storing the values of the time integrals of the voltage of the faulty line loop and of the corresponding second reference voltage at the end of the time interval of integration; and
  means for computing the ratio of the stored values, said ratio being proportional to the distance of the fault point from the point where the currents and voltages are measured.

12. Apparatus for giving the position of a fault with respect to a point located at a preset distance in a polyphase power line comprising:

means for measuring voltages of each of the phase-to-phase and phase-to-ground line loops;

means for measuring currents flowing in each of the phase conductors of the polyphase power line;

means for deriving from said currents and for each of the phase-to-phase and phase-to-ground line loops a first reference voltage proportional to the current flowing in a line loop as well as a second reference voltage proportional to a voltage drop in a reference length of the line loop;

means for detecting the line loop which is faulty;

switching means controlled by the detecting means for selecting the voltage of the faulty line loop as well as the first and second reference voltages corresponding to the faulty line loop;

means for simultaneously integrating the voltage of the faulty line loop and the first and second reference voltages corresponding to the faulty line loop for a time interval which is chosen so that the time integral of the first reference voltage is null at the end thereof, the ratio between the RC time constants of the time integrals of the second reference voltage and of the voltage of the faulty line being proportional to the preset distance;

means for storing the values of the time integrals of the voltage of the faulty line loop and of the corresponding second reference voltage at the end of the time interval;

means for computing the difference between the stored values; and means for comparing the polarities of the difference of the stored values and of the time integral of the second reference voltage, whereby obtaining the position of the fault point with respect to the point at the preset distance.

* * * * *